United States Patent
Watson

(10) Patent No.: US 6,768,103 B2
(45) Date of Patent: Jul. 27, 2004

(54) SYSTEM AND METHOD OF AUTOMATIC DYNAMIC CALIBRATION FOR INFRARED SENSING DEVICE

(75) Inventor: Thomas J. Watson, Madison, AL (US)

(73) Assignee: The Chicago Faucet Company, Chicago, IL (US)

( * ) Notice: Subject to any disclaimer, the term of this patent is extended or adjusted under 35 U.S.C. 154(b) by 0 days.

(21) Appl. No.: 10/714,806

(22) Filed: Nov. 17, 2003

(65) Prior Publication Data

US 2004/0104340 A1 Jun. 3, 2004

Related U.S. Application Data

(63) Continuation of application No. 10/035,749, filed on Oct. 23, 2001, now Pat. No. 6,707,030.
(60) Provisional application No. 60/242,898, filed on Oct. 24, 2000.

(51) Int. Cl.[7] ................................................. G01J 5/02
(52) U.S. Cl. ................................. 250/252.1; 250/338.1
(58) Field of Search ........................... 250/252.1, 338.1, 250/339.09, 341.5, 341.8

(56) References Cited

U.S. PATENT DOCUMENTS

| | | |
|---|---|---|
| 390,960 A | 10/1888 | Gustin |
| 1,940,090 A | 12/1933 | Hetherington |
| 2,539,598 A | 1/1951 | Suska |
| 4,145,769 A | 3/1979 | MacFarlene |
| 4,420,811 A | 12/1983 | Tarnay et al. |
| 4,563,780 A | 1/1986 | Dollack |
| 4,682,728 A | 7/1987 | Dudenhaven |
| 4,700,884 A | 10/1987 | Barrett et al. |
| 4,854,499 A | 8/1989 | Newman |
| 4,923,116 A | 5/1990 | Homan |
| 4,965,448 A | 10/1990 | Morse et al. |
| 4,974,636 A | 12/1990 | Cogger |
| 5,062,453 A | 11/1991 | Saadi et al. |
| 5,170,514 A | 12/1992 | Weigert |
| 5,217,035 A | 6/1993 | Van Marcke |
| 5,243,717 A | 9/1993 | Yasuo |
| 5,328,597 A | 7/1994 | Boldt, Jr. et al. |
| RE35,018 E | 8/1995 | Homan |
| 5,510,269 A * | 4/1996 | Black et al. ................ 436/164 |
| 5,566,702 A | 10/1996 | Philipp |
| 5,570,869 A | 11/1996 | Diaz et al. |
| 5,577,706 A | 11/1996 | King |
| 5,655,561 A | 8/1997 | Wendel et al. |
| 5,819,336 A | 10/1998 | Gilliam et al. |
| 5,910,776 A | 6/1999 | Black |
| 5,915,417 A | 6/1999 | Diaz et al. |
| 6,000,429 A | 12/1999 | Van Marcke |
| 6,006,784 A | 12/1999 | Tsutsui et al. |
| 6,038,519 A | 3/2000 | Gauthier et al. |
| 6,123,093 A | 9/2000 | D'Antonio et al. |
| 6,124,806 A | 9/2000 | Cunningham et al. |

FOREIGN PATENT DOCUMENTS

| | | |
|---|---|---|
| EP | 0 332 045 A2 | 9/1989 |
| EP | 1 164 450 A1 | 12/2001 |
| JP | 62-256112 | 11/1987 |
| JP | 62-269212 | 11/1987 |

* cited by examiner

*Primary Examiner*—Constantine Hannaher
*Assistant Examiner*—Timothy Moran
(74) *Attorney, Agent, or Firm*—Reinhart Boerner Van Deuren s.c.

(57) ABSTRACT

A method for dynamically calibrating automatic infrared sensing devices in commercial use having an IR detector. Randomly reflected emitted IR radiation is detected by the IR detector which sends as IR detector output to a control module. The control module measures whether the detector output is too high or too low compared to a standard range of output values stored in the control module. An IR emitter value is then determined to maintain IR detector output within the standard range of values. This IR emitter input value is stored in the control module as a calibration standard until the calibration cycle.

8 Claims, 3 Drawing Sheets

SYSTEM AND METHOD OF AUTOMATIC DYNAMIC CALIBRATION FOR INFRARED SENSING DEVICE

This application is a continuation of and claims priority to U.S. patent application Ser. No. 10/035,749, titled "System and Method of Automatic Dynamic-Calibration for Infrared Sensing Devices," filed on Oct. 23, 2001, now U.S. Pat. No. 6,707,030 the disclosure of which is incorporated herein by reference. U.S. patent application Ser. No. 10/035,749 claims the benefit of an earlier filed copending provisional patent application titled "Remotely Managed Automatic Dispensing Apparatus and Method," Application No. 60/242,898, filed Oct. 24, 2000, the disclosure of which is hereby incorporated by reference.

BACKGROUND OF THE INVENTION

1. Field of Invention

The present invention relates generally to the field of infrared detecting devices and more particularly to the automatic standardized calibration of infrared detection devices.

2. Technical Background

Various methods have been employed to electronically control water flow through a water control device such as a faucet or spigot. Among the accepted and conventional methods is the use of an optical sensor for detecting reflections from an infrared ('IR') source or IR emitter. Generally speaking, a pulsed IR beam is reflected from an object (such as a user's hands) and sensed to determine whether to activate or deactivate a solenoid valve to control water flow from the water control device. When processing electronics determine the reflection has exceeded a threshold value, a control signal opens a solenoid valve. Pulsed IR sensing remains at the forefront of sensing techniques used with these types of devices due in part to its reasonable performance and low cost.

Because of variations in processing circuits, emitter characteristics and sensor characteristics, it is necessary to calibrate an IR system. Calibration of infrared sensing devices such as, for example, automatically activated flow control devices, is labor intensive and inefficient with respect to devices presently on the market. The low cost IR sensing devices employed in automatically activated flow control devices vary with respect to power requirements, performance, and other criteria. As a result, readings taken by these IR sensing devices (such as whether a user's hands are present beneath the aerator of a faucet) are generally non-uniform from device to device, and therefore often result in improper activation and deactivation of some devices. Similarly, as battery power for these devices decreases over time, so does the power output of the IR sensing devices. Moreover, water droplets sprayed or otherwise deposited on or near a lens or lens cover of an IR sensing device have been known to cause the IR sensing devices to malfunction. As a result, manual calibration of conventional IR sensing devices of automatically activated flow control devices is generally required on a frequent basis following extended periods of use. The repeated manual calibration can be time consuming and costly, particularly when the IR sensing devices are located in areas that are difficult to access.

SUMMARY OF INVENTION

The present invention generally provides a system and method for calibrating infrared detecting devices, which detect the presence of objects by detecting IR reflections. A system in accordance with an exemplary embodiment of the present invention includes calibrating the output of the IR detector by a control module, which receives the output of the IR detector and regulates the input of the IR emitter. The method eliminates or reduces the need to manually calibrate and adjust each IR detector and IR emitter that is part of the infrared detecting device. The control module repeatedly activates the IR emitter with an input value to emit IR radiation, which is reflected from an object in the surrounding environment to the IR detector. The output from the IR detector is transmitted to a control module. If the IR detector output is not within a standard range of values for randomly reflected infrared radiation, a calibration manager increases or decreases the input to the IR emitter. This process is repeated until the output of the IR detector is within the standard range of values. The value of the corresponding input to the IR emitter to maintain this value of the IR detector within the standard range of values is stored in the nonvolatile memory of the control module and the calibration manager reprograms itself to use this calibration value of input to the IR emitter as a reference standard.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
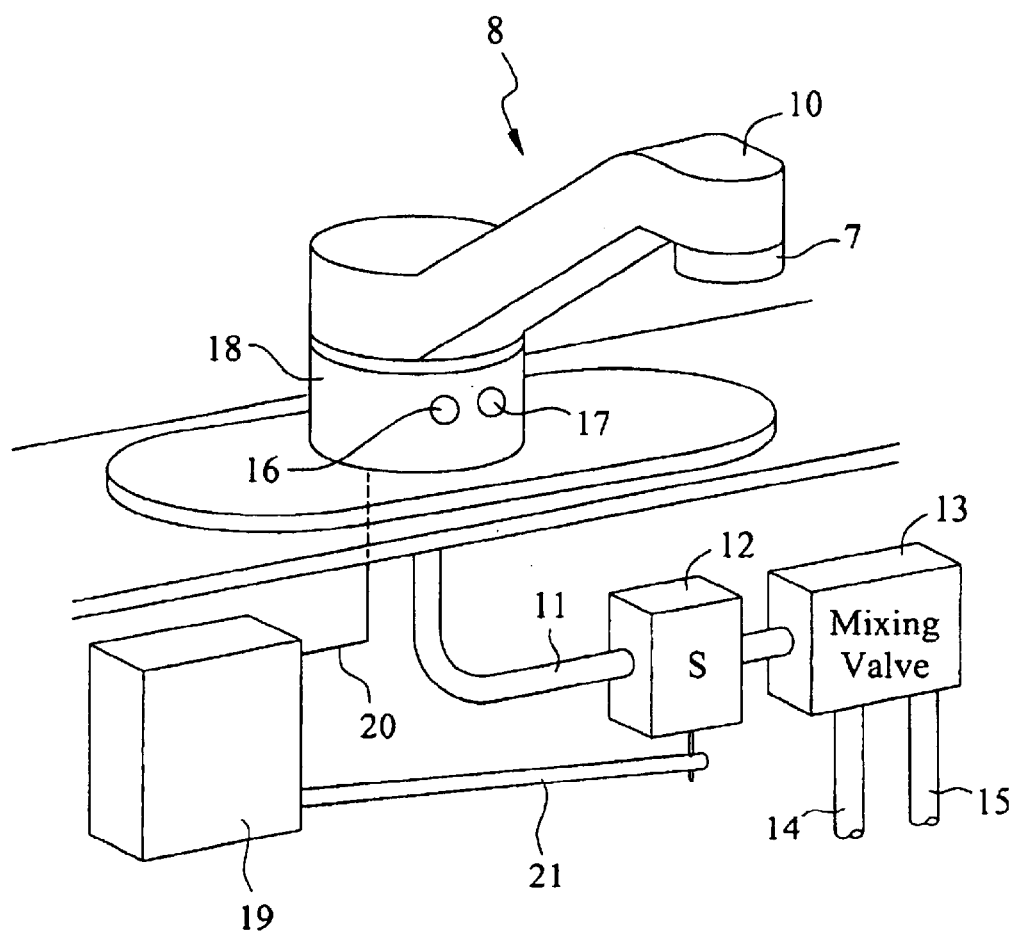
FIG. 1 is a diagram illustrating a fluid dispensing system in accordance with an exemplary embodiment of the present invention.
Figure 2:
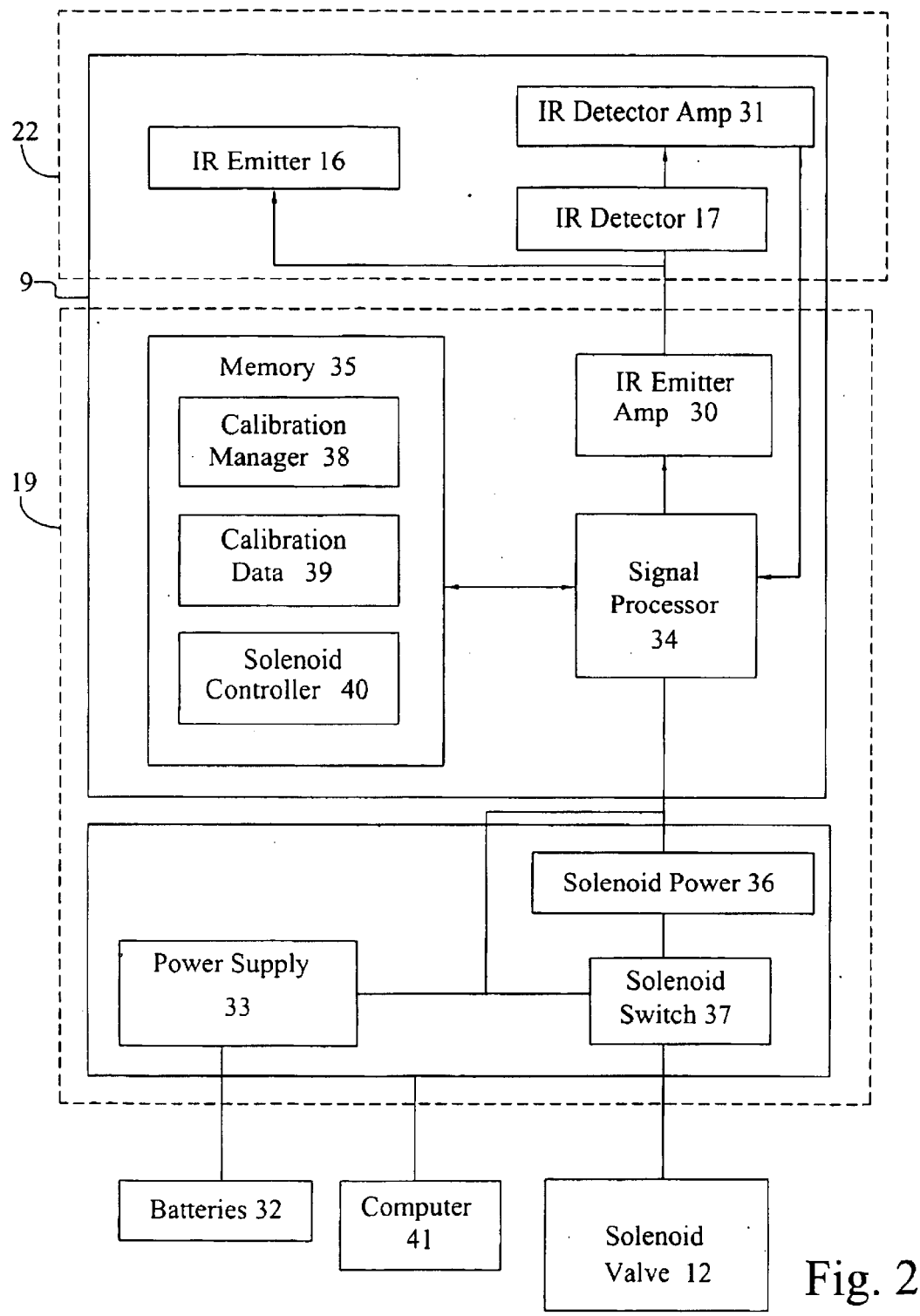
FIG. 2 is a block diagram illustrating a more detailed view of the fluid dispensing system depicted in FIG. 1.

FIGS. 1 and 2 show a fluid dispensing system 8 that employs an infrared detection system 9 in accordance with the present invention. As shown in FIG. 1, the fluid dispensing system 8 includes an automated faucet 10 having an aerator 7 from which fluid (e.g., water) is dispensed. Automated faucet 10 has plumbing 11 in line with a solenoid valve 12 and a mixing valve 13, which is connected to a hot water source 14 and a cold water source 15. Faucet 10 also has IR emitter 16 and IR detector 17 on a sensor board 22 in a collar 18 of the faucet 10. The sensor board 22 is preferably connected electrically to a control module 19 a by connector 20. The connector 20 provides power to sensor board 22 and control module 19. Control module 19 may also be connected electrically to solenoid 12 by connector 21.

In the example shown by FIG. 1 a calibration manager 38 (see FIG. 2) in control module 19 controls the intensity and duration of each pulse emitted from IR emitter 16. When a user places his or her hands near faucet 10 (e.g., underneath aerator 7), the emitted IR pulse is reflected from the hands to IR detector 17. IR detector 17 provides an output value indicative of the amount of the amplitude of the detected pulse, and a solenoid controls the operation of the solenoid valve 12 based on the IR detector's output value. More specifically, the solenoid controller 40 compares the output value to a threshold value stored in memory 35, and will open solenoid valve 12 if the output value exceeds the stored threshold value.

To insure proper operation during use it is desirable to calibrate the IR emitter 16 and IR detector 17. In accordance with the present invention, calibration is performed automatically by the calibration manager 38.

FIG. 2 shows the components of an infrared detecting device used in the calibration procedure for the present invention. Sensor board 22 has IR emitter 16 and IR detector 17, which are connected to IR emitter amp 30 and IR detector amp 31, respectively. Control module 19 has a power supply 33, which receives power from batteries 32 and provides power to a signal processor 34, memory 35, a solenoid power source 36, and a solenoid switch 37. The calibration manager 38 and solenoid controller 40 can be implemented in hardware, software, or a combination thereof In the preferred embodiment, as shown by FIG. 2, the calibration manager 38 and solenoid controller 40 are implemented in software and stored within memory 35. During operation, the signal processor 34 executes the calibration manager 38 and solenoid controller 40. Note that the signal processor 34 can be any known processing element for executing instructions of software programs.

The solenoid switch 37 under the control of solenoid controller 40, can open and close solenoid valve 12. If desired, control module 19 may communicate with a remote computer 41 so that computer 41 can remotely monitor the memory 35 and calibration values obtained during a calibration procedure that will be described in more detail hereafter. Computer 41 may be adapted to use any known operating system and may comprise a processor, random access memory, read only memory, disk drives, display, communications applications, and the like. The values of inputs to the IR emitter 16 and outputs from the IR detector 17 will have optimal or standard ranges in which the infrared detecting device can operate satisfactorily. The minimum end of the range has values below which the fluid dispensing system 8 may not detect a user, and the high end of the range has values above which the fluid dispensing system 8 may falsely detect a user. These maximum and minimum output ranges and the midpoint of these output ranges can be stored in memory 35 as part of the calibration data 39. The infrared detection and calibration system 9 includes sensor board 22, memory 35, and signal processor 34.

Calibration manager 38 is configured to send an appropriate input signal to IR emitter amp 30 to cause IR emitter 16 to emit a pulse of infrared radiation. The amplitude of such a pulse is preferably based on the value or strength of the input signal. The emitted radiation, when reflected by an object in the surrounding environment, is detected by IR detector 17, and an output signal is thereby sent to IR detector amp 31, which then sends an amplified output signal to signal processor 34. Calibration manager 38 is configured to evaluate this output signal based on the standard range of values contained in calibration data 39 and to calibrate the emitter based on such evaluation.

In some cases, IR detector output may be too high because randomly reflected emitted IR radiation is too high. Randomly reflected emitted radiation is emitted radiation that is reflected back to the detector by an object other than a user. As an example, randomly reflected emitted radiation may include radiation reflected from a sink wall. The output signal of the IR detector 17 may, thus, falsely indicate the presence of a user when a significant amount of emitted IR radiation is randomly reflected. If randomly reflected emitted IR radiation is too high, control module 19 can provide an input signal to IR emitter amp 30 to decrease input to IR emitter 16 incrementally as desired, thereby decreasing randomly reflected emitted IR radiation to a desired level. In other cases, the lenses in collar 18 may have a deposit of film or dirt on them so that relatively little randomly reflected emitted IR radiation is detected. Control module 19 can then provide an input signal to IR emitter amp 30 to increase input to IR emitter 16 incrementally as desired, thereby increasing randomly reflected emitted IR radiation to a desired level. The calibration correction tests can be conducted, for example, after every on/off cycle of the solenoid valve 12 or when a quiet period has occurred for a defined period of time.

Figure 3:
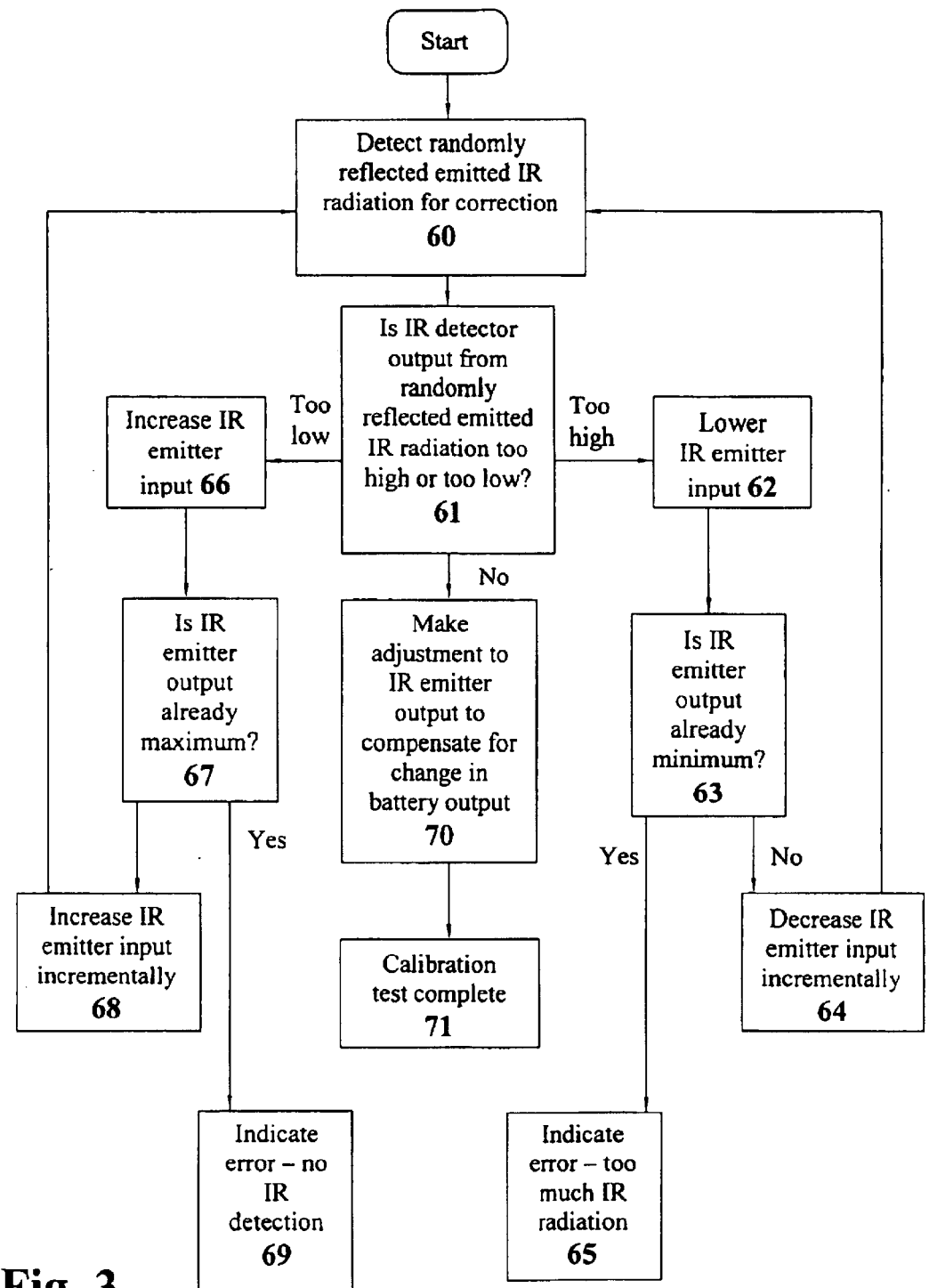
FIG. 3 is a flow chart illustrating the architecture and functionality of an infrared dynamic calibration system depicted in FIG. 2.

The dynamic calibration method of the present invention for IR detecting devices in commercial use is shown in FIG. 3. Control module 19 first tests for IR detector 17 output in response to randomly reflected emitted IR radiation (step 60) which is continuously generated by pulses of emitted infrared radiation in the absence of the user's hands. Calibration manager 38 then determines whether this output in response to detected randomly reflected emitted IR radiation is too high or too low compared to a maximum and minimum range of standard output values contained in calibration data 39 (step 61). If the IR detector 17 output exceeds the maximum of the standard range, calibration manager 38 provides an input signal to IR emitter 16 whereby IR emitter 16 produces an infrared signal or pulse (IR radiation) having a reduced amplitude (Step 62) if IR emitter 16 output is not already at a minimum (step 63). If IR emitter output is not at a minimum, then input to IR emitter 16 is lowered incrementally by calibration manager 38 (step 64). The cycle is repeated (step 60) until detected randomly reflected IR emitter radiation is maintained within the range of standard values. The corresponding input value to the IR emitter 16 is stored in calibration manager 38 of control module 19 as a calibration standard until the next calibration. If IR emitter output is already at minimum, the IR detecting device may be considered defective or inoperable and any suitable indicator can be signaled by control module 19 (step 65).

If randomly reflected emitted IR radiation is too low, calibration manager 38 will then provide an input signal to IR emitter 16 to increase its IR radiation output (step 66) only if IR emitter 16 output is not already at a maximum (step 67). If IR emitter output is not at a maximum, then the input value to IR emitter 16 is increased incrementally (step 68), and the cycle is repeated (step 60) until detected randomly reflected IR emitter radiation is maintained within the range of standard values. The corresponding input value to the IR emitter 16 is stored in calibration manager 38 of control module 19 as a calibration standard until the next calibration. If IR emitter output is already at a maximum, the IR detecting device may be considered defective or inoperable and any suitable indicator can be signaled by control module 19 (step 69).

During use of the IR sensing device, the power output of batteries 32 may decline with time such that IR radiation output from IR emitter 16 may decline with time, resulting in decreased IR detector output. If randomly reflected emitted IR radiation is neither too high nor too low, compared to the standard range of values, calibration manager 38 may make adjustments to IR emitter input to compensate for a change in battery and power supply output by increasing input to IR emitter 16. This adjustment to IR emitter input may be made relative to a minimum and maximum range of standard values for IR emitter input values stored in calibration data 39 (step 70). The calibration test is then complete (step 71). The calibration process can be performed as frequently as desired, preferably every 0.25 seconds, for ambient lighting and change in battery output.

It is apparent from the above description of the calibration method of the present invention that control module 19 calibrates itself rather than making changes directly to the IR emitter and IR detector assembly (collar: 18) that is associated with it. Thus, the collars 18 need no direct calibration and any collar can substitute for any other collar. In use, after replacing a collar with a new collar, or after unplugging and plugging in a collar, the fluid dispensing system 8 will automatically calibrate the new collar without any need for manual calibration. Thus, the method of the present invention greatly facilitates the maintenance of infrared detection devices.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, inputs to IR emitter 16 or outputs from IR detector 17 may be measured in current or voltage. Various types of IR emitters and/or detectors may be employed to implement the IR emitter 16 and/or the IR detector 17 of the present invention. Collar 18 may have other structural features contained therein, such as a microprocessor or an IRDA photodiode for diagnostic and maintenance functions, or a power supply and power source. Control module 19 may have any suitable type of microprocessor or computer to perform programming, software implementation, and data storage and memory. The control module 19 may use an AC source of power instead of batteries.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. A method for automatic calibration of infrared sensing devices, comprising the steps of:

emitting infrared radiation from an infrared emitter;

detecting infrared radiation via an infrared detector, said infrared radiation detected by said infrared detector comprising at least a portion of said infrared radiation emitted from said infrared emitter;

generating a first value indicative of an amount of infrared radiation detected via said detecting step;

comparing said first value to a threshold;

determining a second value based on said comparing step;

storing said second value; and automatically causing said infrared emitter to emit a pulse of infrared radiation based on said second value, wherein an amplitude of said pulse corresponds to said second value.

2. The method of claim 1, wherein said infrared emitter and said infrared detector are attached to a collar of a faucet.

3. The method of claim 1, further comprising the step of controlling a faucet based on infrared radiation detected by said infrared detector.

4. The method of claim 1, further comprising the step of inputting said second value to said infrared emitter.

5. An infrared sensing device, comprising:

an infrared emitter configured to emit infrared radiation;

an infrared detector configured to detect an infrared radiation sample, said infrared radiation sample comprising at least a portion of said infrared radiation emitted by said infrared emitter, said infrared detector configured to output a first value indicative of an amplitude of said infrared radiation sample; and a control module configured to perform a comparison between said first value and a threshold and to generate a second value based on said comparison, said control module further configured automatically cause said infrared emitter to emit a pulse of infrared radiation based on said second value, wherein an amplitude of said pulse corresponds to said second value.

6. The device of claim 5, wherein said infrared emitter and said infrared detector are attached to a collar of a faucet.

7. The device of claim 5, wherein said control module is further configured to control a faucet based on infrared radiation detected by said infrared detector.

8. The device of claim 5, wherein said control module is further configured to input said second value to said infrared emitter.

* * * * *